(12) United States Patent
Nakamura

(10) Patent No.: US 12,202,766 B2
(45) Date of Patent: Jan. 21, 2025

(54) GLASS FIBER AND COMPOSITION FOR GLASS FIBERS

(71) Applicant: Nippon Sheet Glass Company, Limited, Tokyo (JP)

(72) Inventor: Aya Nakamura, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/249,482

(22) PCT Filed: Dec. 28, 2022

(86) PCT No.: PCT/JP2022/048527
§ 371 (c)(1),
(2) Date: Apr. 18, 2023

(87) PCT Pub. No.: WO2024/105894
PCT Pub. Date: May 23, 2024

(65) Prior Publication Data
US 2024/0158282 A1    May 16, 2024

(30) Foreign Application Priority Data

Nov. 16, 2022 (JP) ................. 2022-183744

(51) Int. Cl.
C03C 3/087 (2006.01)
C03C 3/089 (2006.01)
C03C 13/00 (2006.01)

(52) U.S. Cl.
CPC .............. *C03C 3/087* (2013.01); *C03C 3/089* (2013.01); *C03C 13/00* (2013.01); *C03C 2213/00* (2013.01)

(58) Field of Classification Search
CPC ..... C03C 13/00; C03C 2213/00; C03C 3/076; C03C 3/078; C03C 3/085; C03C 3/093; C03C 3/087; C03C 3/089; C03C 3/083; C03C 3/091; C03C 3/095; C03C 3/112; C03C 3/115
See application file for complete search history.

(56) References Cited

U.S. PATENT DOCUMENTS

| | | |
|---|---|---|
| 2010/0160140 A1 | 6/2010 | McGinnis |
| 2020/0140320 A1 | 5/2020 | Nakamura et al. |
| 2021/0403369 A1* | 12/2021 | Li .......................... C03C 13/00 |

FOREIGN PATENT DOCUMENTS

| | | |
|---|---|---|
| CN | 112374763 A | 2/2021 |
| JP | 2002154843 A | 5/2002 |
| JP | 2012513948 A | 6/2012 |
| JP | 2017144430 A | 8/2017 |
| JP | 6343112 B1 | 6/2018 |
| JP | 6391875 B1 | 9/2018 |
| JP | 2022511737 A | 2/2022 |
| WO | 2006057405 A1 | 6/2006 |
| WO | 2020112398 A1 | 6/2020 |

* cited by examiner

*Primary Examiner* — Shuangyi Abu Ali
(74) *Attorney, Agent, or Firm* — HSML P.C.

(57) ABSTRACT

The present disclosure provides a glass composition for glass fibers, the glass composition including, in mass %: $SiO_2$: 59.5 to 62.5%; $Al_2O_3$: 19 to 21.2%; $B_2O_3$: 0 to 0.5%; MgO: 16 to 18%; CaO: 0 to 1.5%; $Li_2O$: 0 to 1.0%; $Na_2O$: 0 to 0.2%; $K_2O$: 0 to 0.1%; $TiO_2$: 0 to 5%; $ZrO_2$: 0 to 5%; ZnO: 0 to 1.5%; and $F_2$: 0 to 0.1%.

10 Claims, No Drawings

GLASS FIBER AND COMPOSITION FOR GLASS FIBERS

TECHNICAL FIELD

The present invention relates to a glass fiber and a glass composition suitable for glass fibers.

BACKGROUND ART

Although many of glass fibers in practical use are formed of a glass composition having a Young's modulus of 90 GPa or less, glass compositions having a Young's modulus of more than 90 GPa are also known. For example, Patent Literature 1 discloses a glass composition including a large amount of rare-earth oxides. The total content of $Y_2O_3$ and $La_2O_3$ in the glass composition of Patent Literature 1 is in the range of 20 to 60 weight %. However, a high rare-earth oxide content increases the manufacturing cost. Taking this into account, Patent Literature 2 discloses a technique by which the Young's modulus of a glass composition is improved without a large amount of rare-earth oxides. The glass composition of Patent Literature 2 includes 15 to 30% MgO in mol % as a component for improving the Young's modulus.

CITATION LIST

Patent Literature

Patent Literature 1: WO 2006/057405 A1
Patent Literature 2: JP 6391875 B1

SUMMARY OF INVENTION

Technical Problem

Patent Literature 2 fails to specifically discuss the acid resistance of the glass composition. Additionally, it is desirable that mass production of a glass fiber and other shaped glass products can continue without devitrification. It is therefore an object of the present invention to provide a glass fiber having a high Young's modulus and a high acid resistance and suitable for mass production and a glass composition suitable for manufacturing such a glass fiber.

Solution to Problem

Through studies on a blending ratio of glass components, the present inventor has completed a glass composition suitable for a glass fiber having a good balance between the acid resistance, the Young's modulus, and the mass productivity.

The present invention provides a glass composition for glass fibers, the glass composition including, in mass %:

| | |
|---|---|
| $SiO_2$ | 59.5 to 62.5%; |
| $Al_2O_3$ | 19 to 21.2%; |
| $B_2O_3$ | 0 to 0.5%; |
| MgO | 16 to 18%; |
| CaO | 0 to 1.5%; |
| $Li_2O$ | 0 to 1.0%; |
| $Na_2O$ | 0 to 0.2%; |
| $K_2O$ | 0 to 0.1%; |
| $TiO_2$ | 0 to 5%; |
| $ZrO_2$ | 0 to 5%; |
| ZnO | 0 to 1.5%; and |
| $F_2$ | 0 to 0.1%. |

The present invention also provides a glass fiber including the glass composition for glass fibers according to the present invention.

Advantageous Effects of Invention

The present invention provides a glass fiber having a good balance between the acid resistance, the Young's modulus, and the mass productivity and a glass composition for glass fibers, the glass composition being suitable for such a glass fiber.

DESCRIPTION OF EMBODIMENTS

Embodiments of the present invention will be described hereinafter. The following description is not intended to limit the present invention to particular embodiments. Herein, the content of each component in a glass composition below is in mass %, and mass % is basically represented by "%". Herein, being "substantially free of" a component means that the content of the component is less than 0.1 mass %, less than 0.05 mass %, less than 0.01 mass %, less than 0.005 mass %, even less than 0.003 mass %, or, in some cases, less than 0.001 mass %. The adverb "substantially" is intended to mean that a small amount impurities such as those derived from a glass raw material, a manufacturing apparatus, and the like may be contained. The term "alkali metal oxides" means $Li_2O$, $Na_2O$, and $K_2O$, and is sometimes referred to as $R_2O$. The upper and lower limits of each of the following contents can be arbitrarily combined in both cases where the upper and lower limits are individually specified and where the upper and lower limits are expressed as a range.

[Glass Composition]
<Components>

Components that can form the glass composition of the present embodiment will be each described hereinafter.

($SiO_2$)

$SiO_2$ is a component that forms a glass network, and is also a component that adjusts the devitrification temperature and the viscosity during glass forming and that improves the acid resistance. A $SiO_2$ content is, for example, 59.5 to 62.5%. The lower limit of the $SiO_2$ content may be 59.6% or more, 59.8% or more, or even 60% or more. The upper limit of the $SiO_2$ content may be 62.3% or less, 62% or less, 61.8%, or even 61.5% or less. The $SiO_2$ content may be 59.6 to 61.5%.

($Al_2O_3$)

$Al_2O_3$ is a component that adjusts the devitrification temperature and the viscosity during glass forming and that contributes to improvement of the water resistance of the resulting glass. An $Al_2O_3$ content is, for example, 19 to 21.2%. The lower limit of the $Al_2O_3$ content may be, for example, 19.3% or more, 19.5% or more, 19.7% or more, or even 20% or more. The upper limit of the $Al_2O_3$ content may be 21% or less, 20.8% or less, or even 20.6% or less. The $Al_2O_3$ content may be 19.7 to 20.6%.

($B_2O_3$)

$B_2O_3$ is an optional component that forms a glass network and that adjusts the devitrification temperature and the viscosity during glass forming. A $B_2O_3$ content is, for example, 0 to 0.5%. The lower limit of the $B_2O_3$ content may be 0.02% or more. The upper limit of the $B_2O_3$ content may be 0.3% or less, 0.1% or less, or even 0.08% or less. The glass composition of the present embodiment may be substantially free of $B_2O_3$.

(MgO)

MgO is a component that improves the Young's modulus and that affects the devitrification temperature, the viscosity, and the like. A MgO content is, for example, 16 to 18%. The lower limit of the MgO content may be 16.5% or more, 16.6% or more, 16.8% or more, or even 17% or more. The upper limit of the MgO content may be 17.8% or less, 17.7% or less, or even 17.6% or less. The MgO content may be 16.6 to 17.6%.

(CaO)

CaO is an optional component that adjusts the devitrification temperature and the viscosity during glass forming. A CaO content is, for example, 0 to 1.5%. The lower limit of the CaO content may be 0.1% or more, 0.3% or more, 0.5% or more, or even 0.7% or more. The upper limit of the CaO content may be 1.4% or less, 1.3% or less, 1.2% or less, or even 1% or less.

(Alkali Metal Oxides)

Alkali metal oxides ($R_2O$) are optional components that adjust the devitrification temperature and the viscosity during glass forming. A total alkali metal oxide content, specifically, $Li_2O+Na_2O+K_2O$, is, for example, 0 to 1.3%. The lower limit of the total alkali metal oxide content may be 0.05% or more, 0.1% or more, 0.2% or more, or even 0.3% or more. The upper limit of the $R_2O$ content may be 1.2% or less, 1.0% or less, 0.9% or less, or even 0.8% or less. A high $R_2O$ content can sometimes prevent a sufficient increase in Young's modulus.

A $Li_2O$ content is, for example, 0 to 1.0%. The lower limit of the $Li_2O$ content is 0.1% or more, or 0.2% or more, and may be 0.3% or more, or even 0.4% or more. The upper limit of the $Li_2O$ content may be 0.8% or less, 0.6% or less, or even 0.5% or less. A preferred example of the $Li_2O$ content is 0.1 to 0.8%. $Li_2O$ has an advantage over $Na_2O$ and $K_2O$ in that both reduction of a Young's modulus decreasing effect and adjustment of properties such as the devitrification temperature are achieved. The $Li_2O$ content may be higher than a $Na_2O$ content, may be higher than a $K_2O$ content, and may be higher than the sum of the $Na_2O$ content and the $K_2O$ content. However, the glass composition of the present embodiment may be substantially free of $Li_2O$.

The $Na_2O$ content is, for example, 0 to 0.2%. The upper limit of the $Na_2O$ content may be 0.18% or less, 0.15% or less, 0.13% or less, 0.1% or less, or even 0.08% or less. The glass composition of the present embodiment may be substantially free of $Na_2O$.

The $K_2O$ content is, for example, 0 to 0.1%. The upper limit of the $K_2O$ content may be 0.08% or less, even 0.06% or less, or even 0.04% or less. The glass composition of the present embodiment may be substantially free of $K_2O$.

($TiO_2$ and $ZrO_2$)

$TiO_2$ and $ZrO_2$ are optional components that can contribute to improvement of the acid resistance. $TiO_2$ and $ZrO_2$ are each added to account for, for example, 0 to 5%. A $TiO_2$ content and a $ZrO_2$ content may each be 0.1% or more, 0.3% or more, 0.5% or more, 1% or more, or even 1.2% or more. The $TiO_2$ content and the $ZrO_2$ content may each be 4% or less, 3% or less, 2.5% or less, or even 2% or less. However, the glass composition of the present embodiment can have a favorable acid resistance without adding $TiO_2$ and $ZrO_2$. The glass composition of the present embodiment may be substantially free of $TiO_2$. The glass composition of the present embodiment may be substantially free of $ZrO_2$, either.

(ZnO)

ZnO is an optional component that may be added. ZnO is added to account for, for example, 0 to 1.5%. The upper limit of the ZnO content may be 1.4% or less, 1% or less, or even 0.5% or less. The glass composition of the present embodiment may be substantially free of ZnO.

($F_2$)

$F_2$ is also an optional component that may be added for refining or the like. $F_2$ is added to account for, for example, 0 to 0.1%. The upper limit of the $F_2$ content may be 0.08% or less. The glass composition of the present embodiment may be substantially free of $F_2$.

($SiO_2+TiO_2+ZrO_2$)

A sum ($SiO_2+TiO_2+ZrO_2$) of the $SiO_2$ content, the $TiO_2$ content, and the $ZrO_2$ content may be 60% or more, 60.5% or more, or even 61% or more. The glass composition having a high ($SiO_2+TiO_2+ZrO_2$) is suitable for achieving a high acid resistance. The upper limit of ($SiO_2+TiO_2+ZrO_2$) is not limited to a particular one, and is, for example, 63.5% or less, 63% or less, or even 62.5% or less.

($TiO_2+ZrO_2$)

A sum ($TiO_2+ZrO_2$) of the $TiO_2$ content and the $ZrO_2$ content may be 0.1% or more, 0.2% or more, 0.5% or more, or even 1% or more. The glass composition including ($TiO_2+ZrO_2$) in an appropriate range is suitable for achieving a high acid resistance. The upper limit of ($TiO_2+ZrO_2$) is not limited to a particular one, and is, for example, 5% or less, or even 3% or less. The glass composition can include 59.5 to 61.5% or even 60 to 61% $SiO_2$, and 0.1 to 3% ($TiO_2+ZrO_2$).

($SiO_2+Al_2O_3+MgO$)

A sum ($SiO_2+Al_2O_3+MgO$) of the $SiO_2$ content, the $Al_2O_3$ content, and the MgO content may be 95% or more, 96% or more, 97% or more, or even 97.5% or more. The sum ($SiO_2+Al_2O_3+MgO$) may be, for example, 99% or less, or even 98.5% or less.

($CaO+R_2O$)

Addition of CaO and the alkali metal oxides ($R_2O$) is suitable for adjustment of the devitrification temperature of the glass composition. The sum ($CaO+R_2O$) of the CaO content and the $R_2O$ content may be 0 to 2.5%. The lower limit of ($CaO+R_2O$) may be, for example, 0.05% or more, 0.1% or more, 0.3% or more, 0.5% or more, 0.7% or more, or even 1% or more. The upper limit of ($CaO+R_2O$) may be, for example, 2.3% or less, 2.2% or less, 2% or less, or even 1.8% or less.

(Additional Components)

The glass composition may include a component other than those described above. The additional component the glass composition can include are, for example, $Fe_2O_3$, $Y_2O_3$, $La_2O_3$, SrO, BaO, $Cl_2$, $SnO_2$, $CeO_2$, $P_2O_5$, or $SO_3$.

$Fe_2O_3$ is added to account for, for example, 0 to 1%. The upper limit of the $Fe_2O_3$ content may be 0.5%, 0.3% or less, 0.2% or less, or even 0.15% or less. The glass composition of the present embodiment may be substantially free of $Fe_2O_3$. It should be noted that although part of iron oxide is present as FeO in the glass composition, the iron oxide content is calculated as $Fe_2O_3$, as is conventional.

$Y_2O_3$ and $La_2O_3$ are optional components that contribute to improvement of the Young's modulus. However, raw materials of these components are relatively expensive. A sum of a $Y_2O_3$ content and a $La_2O_3$ content is, for example, 0 to 5%. The upper limit of the sum of the $Y_2O_3$ content and the $La_2O_3$ content may be 3% or less, 2% or less, 1% or less, or even 0.5% or less. The glass composition of the present embodiment may be substantially free of $Y_2O_3$. The glass composition of the present embodiment may be substantially free of $La_2O_3$, either.

The SrO, BaO, $Cl_2$, $SnO_2$, $CeO_2$, $P_2O_5$, and $SO_3$ contents are each, for example, 0 to 0.5%. The upper limit of the content of each of these components may be 0.3% or less, 0.2% or less, or even 0.1% or less. The glass composition of the present embodiment may be substantially free of each of these components.

<Properties>
(Young's Modulus)

The glass composition of the present embodiment has a Young's modulus of, for example, 97 GPa or more. The lower limit of the Young's modulus can be 98 GPa or more, 99 GPa or more, or, in some cases, 100 GPa or more. The upper limit of the Young's modulus is not limited to a particular one, and may be, for example, 115 GPa or less, or even 110 GPa or less.

(Acid Resistance)

The acid resistance can be evaluated by a mass decrease rate $\Delta W_1$ (%) obtained by a test described in EXAMPLES. The mass decrease rate $\Delta W_1$ of the glass composition of the present embodiment is, for example, 0.1 mass % or less. The upper limit of the mass decrease rate $\Delta W_1$ can be 0.08 mass % or less, 0.07 mass % or less, or even 0.06 mass % or less.

(Alkali Resistance)

The alkali resistance can be evaluated by a mass decrease rate $\Delta W_2$ (%) obtained by a test described in EXAMPLES. The mass decrease rate $\Delta W_2$ of the glass composition of the present embodiment is, for example, 0.8 mass % or less. The upper limit of the mass decrease rate $\Delta W_2$ can be 0.7 mass % or less, 0.65 mass % or less, or even 0.6 mass % or less.

(Density)

The glass composition of the present embodiment has a density of, for example, 2.65 $g/cm^3$ or less. The upper limit of the density can be 2.63 $g/cm^3$ or less, 2.6 $g/cm^3$ or less, or even 2.59 $g/cm^3$ or less. The lower limit of the density is not limited to a particular one, and may be, for example, 2.45 $g/cm^3$ or more, or even 2.5 $g/cm^3$ or more.

(Property Temperatures)

In the present embodiment, a temperature T3 at which a viscosity of a molten glass becomes $10^3$ dPa·s is, for example, 1370° C. or lower. The upper limit of T3 can be 1360° C. or lower, 1350° C. or lower, 1345° C. or lower, or even 1320° C. or lower. A low temperature T3 can contribute to extension of the service life of a glass fiber manufacturing apparatus. The lower limit of T3 is not limited to a particular one, and is, for example, 1280° C. or higher. Likewise, a temperature T2.5 at which the viscosity of the molten glass becomes $10^{2.5}$ dPa·s is, for example, 1450° C. or lower.

A devitrification temperature TL is a temperature at which a crystal is generated in a molten raw glass and starts to grow. The devitrification temperature TL is, for example, 1360° C. or lower. The upper limit of TL can be 1350° C. or lower, 1340° C. or lower, 1330° C. or lower, 1320° C. or lower, or even 1300° C. or lower. The lower limit of TL is not limited to a particular one, and may be 1200° C. or higher, or even 1230° C. or higher.

In the present embodiment, TL can be a temperature lower than T3. In this case, the difference T3−TL (=ΔT) is a positive value (ΔT>0). With an increase in the temperature difference ΔT (T3−TL), which is determined by subtracting the devitrification temperature from a working temperature, occurrence of devitrification during glass forming is reduced, so that homogeneous glass can be manufactured in a high yield. The difference ΔT of the glass composition of the present embodiment can be 2° C. or more, 5° C. or more, or even 10° C. or more. The upper limit of the difference ΔT is not limited to a particular one, and may be 50° C. or less, or even 40° C. or less.

Among glass fibers, a long glass fiber is commonly manufactured by drawing a molten raw glass out of a nozzle of a bushing provided at the bottom of a furnace and continuously winding the molten raw glass by a winding machine to be formed into a fiber shape. A short glass fiber is manufactured, for example, by allowing a molten raw glass to flow out of the bottom of a furnace into a high-speed rotating spinner and extending a fiber-shaped glass flying out of a hole on a side of the spinner by centrifugal force much thinner by pressure by a gas jet or the like. As can be understood from these manufacturing processes, the glass composition for glass fibers desirably has a positive difference ΔT, taking mass production into account.

[Glass Fiber]

The glass composition of the present embodiment is suitable for manufacturing a glass fiber. The glass fiber may be a long glass fiber or a short glass fiber. The glass fiber may be in a form of, for example, at least one selected from the group consisting of a strand, a roving, a yarn, a cloth, a chopped strand, glass wool, and a milled fiber. The cloth is, for example, a roving cloth or a yarn cloth.

Because of its excellent properties, the glass composition of each of the above embodiments can also be used as a shaped glass product other than a glass fiber. An example of the shaped glass product is a glass particle. The glass particle can be manufactured by breaking the glass fiber so finely that the outer shape of the glass fiber is lost or by using, as for the glass fiber, a nozzle having a shape corresponding to an intended shape. The glass composition of each of the above embodiments is also suitable for manufacturing the glass particle without undergoing devitrification. In one embodiment of the present invention, the glass particle includes the glass composition of any of the above embodiments or is formed of the glass composition of any of the above embodiments.

The glass particle may be, for example, an equivalent of at least one selected from the group consisting of a glass flake, a glass powder, a glass bead, and a fine flake. The glass particle can be included in FRPs. In other words, the glass particle can be used for reinforcement, for example, of a reinforced body typically formed of a resin.

Taking into account the fact that the above-described glass composition can be included also in the glass particle, the above-described glass composition can be regarded as a glass composition for glass fibers or glass particles.

[Non-Woven Fabric, Rubber-Reinforcing Cord]

Each glass fiber provided by the present invention can be used in the same applications as conventional glass fibers. In one embodiment of the present invention, a non-woven glass fiber fabric including the glass fiber is provided. In another embodiment of the present invention, a rubber-reinforcing cord including a strand including a bundle of the glass fibers is provided. The glass fiber can also be used in other applications. Examples of the other applications include reinforcement of a reinforced body typically formed of a resin.

Examples

Hereinafter, the embodiment of the present invention will be described in more detail by Examples and Comparative Examples. The contents of components in composition are expressed in mass % also in the tables below.

<Preparation of Glass Composition>

Common glass raw materials such as silica sand were blended to give each glass composition shown in Tables 1 and 2, and glass raw material batches were prepared for Examples and Comparative Examples. Each batch was molten by heating it to 1500 to 1600° C. using an electric furnace, and the molten state was maintained as it was for about 4 hours until the composition became uniform. After that, part of the molten glass (glass melt) was poured onto an iron plate, and was slowly cooled to room temperature in an electric furnace. A glass composition (sheet-shaped body; glass specimen) as a bulk was obtained in this manner. Properties of thus-obtained glass compositions were evaluated as follows. The results are collectively shown in Tables 1 and 2. Blanks indicate no measurement.

(T2.5 and T3)

For each obtained glass composition, the relationship between viscosity and temperature was examined by a common platinum ball-drawing method, and T2.5 and T3 were determined from the examination result. The platinum ball-drawing method is a method that measures the viscosity of molten glass by dipping a platinum ball in the molten glass, drawing the platinum ball upward at a uniform velocity, determining the relationship between the load (friction) during the upward drawing of the platinum ball and the gravity, buoyancy, etc. acting on the platinum ball, and applying the determined relationship to the Stokes' law which states the relationship between the viscosity of a fluid and the fall velocity at which a small particle settles down in the fluid.

(TL)

Each glass composition crushed to a particle diameter of 1.0 to 2.8 mm was put in a platinum boat. The glass composition in the boat was left in an electric furnace with a temperature gradient (800 to 1400° C.) for 2 hours. The devitrification temperature TL of the glass composition was determined from the maximum temperature of the electric furnace at a location where a crystal appeared. In the case where the glass turned cloudy and no crystal was able to be observed, the maximum temperature of the electric furnace at a location where cloudiness appeared was defined as the devitrification temperature. Here, the particle diameter is a value measured by sieving. It should be noted that different temperatures at different places in the electric furnace (temperature distribution in the electric furnace) were measured in advance, and the glass composition placed at a given place in the electric furnace was heated at the temperature measured in advance for the given place.

(Young's Modulus)

The Young's modulus was determined by an equation $E=3\rho \cdot v_t^2 \cdot (v_t^2 - 4/3 \cdot v_t^2)/(v_t^2 - v_t^2)$. A longitudinal wave velocity vi and a transverse wave velocity $v_t$ were measured by a common ultrasonic method for an elastic wave propagating through glass. A density $\rho$ was separately measured for the glass by Archimedes' principle.

(Acid Resistance and Alkali Resistance)

A glass monofilament having a diameter of 15 μm was cut to a length of 20 mm, and was weighed in grams equivalent to the specific gravity of the glass. The glass fiber was immersed for 60 minutes in 80 mL of an aqueous sulfuric acid solution having a temperature of 99° C. and a specific gravity of 1.2. A mass decrease rate was determined for this case and was defined as $\Delta W_1$. Moreover, a glass monofilament having a diameter of 15 μm was cut to a length of 20 mm, and was weighed in grams equivalent to the specific gravity of the glass. The glass fiber was immersed for 24 hours in 100 mL of a 10 mass % aqueous sodium hydroxide solution having a temperature of 80° C. A mass decrease rate was determined for this case and was defined as $\Delta W_2$.

The above mass decrease rates were calculated by the following equation, where Wa is the mass before the immersion, and Wb is the mass after the immersion.

Mass decrease rate (%)={(Wa−Wb)/Wa}×100

TABLE 1

| | Example | | | | | | |
|---|---|---|---|---|---|---|---|
| | 1 | 2 | 3 | 4 | 5 | 6 | 7 |
| $SiO_2$ | 60.4 | 60.3 | 61.2 | 59.6 | 60.5 | 60.1 | 60.0 |
| $Al_2O_3$ | 20.5 | 20.5 | 19.7 | 20.2 | 20.5 | 20.4 | 20.4 |
| $B_2O_3$ | 0.06 | 0.06 | 0.06 | 0.06 | 0.00 | 0.00 | 0.06 |
| MgO | 17.5 | 17.5 | 17.6 | 16.6 | 17.6 | 16.8 | 16.7 |
| CaO | 0.9 | 0.9 | 0.9 | 0.9 | 0.9 | 0.9 | 0.9 |
| $Li_2O$ | 0.5 | 0.5 | 0.5 | 0.5 | 0.5 | 0.5 | 0.5 |
| $Na_2O$ | 0.0 | 0.1 | 0.0 | 0.0 | 0.0 | 0.0 | 0.0 |
| $K_2O$ | 0.0 | 0.0 | 0.1 | 0.0 | 0.0 | 0.0 | 0.0 |
| $Fe_2O_3$ | 0.0 | 0.1 | 0.0 | 0.0 | 0.0 | 0.0 | 0.0 |
| $TiO_2$ | 0.0 | 0.0 | 0.0 | 0.0 | 0.0 | 1.3 | 0.0 |
| $ZrO_2$ | 0.0 | 0.0 | 0.0 | 2.0 | 0.0 | 0.0 | 0.0 |
| ZnO | 0.0 | 0.0 | 0.0 | 0.0 | 0.0 | 0.0 | 1.4 |
| $SiO_2 + TiO_2 + ZrO_2$ | 60.4 | 60.3 | 61.2 | 61.6 | 60.5 | 61.4 | 60.0 |
| Acid resistance $\Delta W_1$ | 0.07 | 0.07 | 0.03 | 0.05 | 0.07 | 0.02 | 0.07 |
| Alkali resistance $\Delta W_2$ | 0.49 | 0.49 | | 0.57 | 0.49 | 0.58 | 0.62 |
| Density d (g/cm³) | 2.59 | 2.59 | | 2.59 | 2.59 | 2.58 | |
| Young's modulus E (GPa) | 100.0 | 100.0 | 99.6 | 100.2 | 100.6 | 100.0 | 99.7 |
| Devitrification temperature TL (C. °) | 1297 | 1299 | 1317 | 1285 | 1293 | 1287 | 1291 |
| T2.5 (C. °) | 1393 | 1392 | 1343 | 1405 | 1397 | 1401 | 1389 |
| T3 (C. °) | 1309 | 1307 | 1319 | 1319 | 1312 | 1315 | 1304 |

TABLE 2

| | Comparative Example | | | | | | | |
|---|---|---|---|---|---|---|---|---|
| | 1 | 2 | 3 | 4 | 5 | 6 | 7 | 8 |
| $SiO_2$ | 59.0 | 56.8 | 57.9 | 59.4 | 61.6 | 60.8 | 58.8 | 62.5 |
| $Al_2O_3$ | 27.5 | 21.0 | 24.5 | 24.4 | 17.4 | 22.5 | 25.8 | 18.8 |
| $B_2O_3$ | 0.1 | 1.1 | 0.1 | 0.1 | 0.0 | 1.7 | 1.1 | 0.06 |
| MgO | 12.1 | 14.9 | 14.2 | 12.8 | 19.3 | 14.4 | 10.2 | 16.9 |
| CaO | 0.9 | 3.7 | 0.9 | 0.9 | 1.0 | 0.1 | 2.7 | 0.9 |
| $Li_2O$ | 0.5 | 0.5 | 0.5 | 0.5 | 0.3 | 0.4 | 0.5 | 0.3 |
| $Na_2O$ | 0.0 | 0.0 | 0.0 | 0.0 | 0.5 | 0.1 | 1.0 | 0.5 |
| $K_2O$ | 0.0 | 0.0 | 0.0 | 0.0 | 0.0 | 0.0 | 0.0 | 0.0 |
| $Fe_2O_3$ | 0.0 | 0.0 | 0.0 | 0.0 | 0.0 | 0.0 | 0.0 | 0.0 |
| $TiO_2$ | 0.0 | 2.0 | 0.0 | 0.0 | 0.0 | 0.0 | 0.0 | 0.0 |
| $ZrO_2$ | 0.0 | 0.0 | 2.0 | 2.0 | 0.0 | 0.0 | 0.0 | 0.0 |
| ZnO | 0.0 | 0.0 | 0.0 | 0.0 | 0.0 | 0.0 | 0.0 | 0.0 |
| $SiO_2 + TiO_2 + ZrO_2$ | 59.4 | 58.8 | 57.9 | 61.4 | 61.6 | 60.8 | 58.8 | 62.5 |
| Acid resistance $\Delta W_1$ | 0.16 | 0.24 | 0.12 | 0.07 | 0.12 | 0.30 | | 0.06 |
| Alkali resistance $\Delta W_2$ | | | 0.70 | 0.73 | | | | |
| Density d (g/cm$^3$) | | 2.61 | | | | | | |
| Young's modulus E (GPa) | 101.2 | 100.5 | 100.9 | 100.2 | 98.2 | 96 | 94 | 96.6 |
| Devitrification temperature TL (C. °) | | >1380 | >1380 | 1348 | >1380 | | 1327 | 1332 |
| T2.5 (C. °) | | 1424 | 1448 | 1362 | | | 1446 | 1414 |
| T3 (C. °) | | 1338 | 1361 | 1282 | | | 1356 | 1323 |

Each Example achieved a Young's modulus of 97 GPa or more, a mass decrease rate $\Delta W_1$ of 0.1% or less, and a positive difference $\Delta T$. On the other hand, not all of these properties were able to be satisfied in each Comparative Example.

As described above, the present description discloses the following techniques.

(Technique 1)

A glass composition for glass fibers, including, in mass %:

| | |
|---|---|
| $SiO_2$ | 59.5 to 62.5%; |
| $Al_2O_3$ | 19 to 21.2%; |
| $B_2O_3$ | 0 to 0.5%; |
| MgO | 16 to 18%; |
| CaO | 0 to 1.5%; |
| $Li_2O$ | 0 to 1.0%; |
| $Na_2O$ | 0 to 0.2%; |
| $K_2O$ | 0 to 0.1%; |
| $TiO_2$ | 0 to 5%; |
| $ZrO_2$ | 0 to 5%; |
| ZnO | 0 to 1.5%; and |
| $F_2$ | 0 to 0.1%. |

(Technique 2)

The glass composition according to Technique 1, wherein a sum ($SiO_2+TiO_2+ZrO_2$) of a $SiO_2$ content, a $TiO_2$ content, and a $ZrO_2$ content is 60% or more in mass %.

(Technique 3)

The glass composition according to Technique 1 or 2, wherein a sum ($TiO_2+ZrO_2$) of a $TiO_2$ content and a $ZrO_2$ content is 0.1% or more in mass %.

(Technique 4)

The glass composition according to any one of Techniques 1 to 3, being substantially free of $Y_2O_3$ and $La_2O_3$.

(Technique 5)

The glass composition according to any one of Techniques 1 to 4, having a Young's modulus of 97 GPa or more.

(Technique 6) The glass composition according to any one of Techniques 1 to 5, wherein $\Delta T$ determined by subtracting a devitrification temperature TL from a temperature T3 at which a viscosity becomes $10^3$ dPa·s is a positive value.

(Technique 7)

The glass composition according to any one of Techniques 1 to 6, wherein $\Delta W_1$ is 0.1 mass % or less, where $\Delta W_1$ is a mass decrease rate determined for a case where the glass composition has a mass in grams equivalent to a specific gravity of the glass composition and is immersed for 60 minutes in 80 mL of sulfuric acid having a specific gravity of 1.2 and a temperature of 99° C.

(Technique 8)

A glass fiber comprising the glass composition according to any one of Techniques 1 to 7.

(Technique 9)

The glass fiber according to Technique 8, being in a form of at least one selected from the group consisting of a strand, a roving, a yarn, a cloth, a chopped strand, glass wool, and a milled fiber.

The invention claimed is:

1. A glass composition for glass fibers, comprising, in mass %:

| | |
|---|---|
| $SiO_2$ | 59.5 to 62.5%; |
| $Al_2O_3$ | 19 to 21.2%; |
| $B_2O_3$ | 0 to 0.5%; |
| MgO | 16 to 18%; |
| CaO | 0 to 1.5%; |
| $Li_2O$ | 0 to 1.0%; |
| $Na_2O$ | 0 to 0.2%; |
| $K_2O$ | 0 to 0.1%; |
| $TiO_2$ | 0 to 5%; |
| $ZrO_2$ | 0 to 5%; |
| ZnO | 0 to 1.5%; and |
| $F_2$ | 0 to 0.1% | wherein a sum ($SiO_2+Al_2O_3+MgO$) of a $SiO_2$ content, a $Al_2O_3$ content, and a MgO content is 95% or more in mass %, the glass composition has a Young's modulus of 97 GPa or more, the glass composition is substantially free of rare-earth oxides, the glass composition has a density of 2.45 g/cm$^3$ or more and 2.6 g/cm$_3$ or less, ΔT determined by subtracting a devitrification temperature TL from a temperature T3 at which a viscosity becomes $10^3$ dPa·s is a positive value; and $\Delta W_1$ is 0.1 mass % or less, when the glass composition is formed into a glass monofilament having a diameter of 15 μm and a length of 20 mm, where $\Delta W_1$ is a mass decrease rate determined for a case where the glass composition has a mass in grams equivalent to a specific gravity of the glass composition and is immersed for 60 minutes in 80 mL of sulfuric acid having a specific gravity of 1.2 and a temperature of 99° C.

2. The glass composition according to claim 1, wherein a sum ($SiO_2+TiO_2+ZrO_2$) of a $SiO_2$ content, a $TiO_2$ content, and a $ZrO_2$ content is 60% or more in mass %.

3. The glass composition according to claim 1, wherein a sum ($TiO_2+ZrO_2$) of a $TiO_2$ content and a $ZrO_2$ content is 0.1% or more in mass %.

4. A glass fiber comprising the glass composition according to claim 1.

5. The glass fiber according to claim 4, being in a form of at least one selected from the group consisting of a strand, a roving, a yarn, a cloth, a chopped strand, glass wool, and a milled fiber.

6. The glass composition according to claim 1, having a Young's modulus of 98 GPa or more.

7. The glass composition according to claim 1, having a Young's modulus of 99 GPa or more.

8. The glass composition according to claim 1, wherein a content of the rare-earth oxides is 0.05% or less in mass %.

9. The glass composition according to claim 1, wherein $\Delta W_2$ is 0.8 mass % or less, where $\Delta W_2$ is a mass decrease rate determined for a case where the glass composition has a mass in grams equivalent to a specific gravity of the glass composition and is immersed for 24 hours in 100 mL of sodium hydroxide solution having a sodium hydroxide of 10 mass % and a temperature of 80° C.

10. The glass composition according to claim 1, wherein the MgO content is 16.6% or more and 17.7% or less in mass %.

* * * * *